US008510155B2

(12) United States Patent
Hoang et al.

(10) Patent No.: US 8,510,155 B2
(45) Date of Patent: Aug. 13, 2013

(54) WIRELESS ELECTRONIC VEHICLE WINDOW DISPLAY SYSTEM

(75) Inventors: Tony Hoang, Irvine, CA (US); Scott Lucas, Scottsdale, AZ (US)

(73) Assignee: CDMData, LLC, St. Paul, MN (US)

( * ) Notice: Subject to any disclaimer, the term of this patent is extended or adjusted under 35 U.S.C. 154(b) by 675 days.

(21) Appl. No.: 12/130,761

(22) Filed: May 30, 2008

(65) Prior Publication Data

US 2008/0300988 A1     Dec. 4, 2008

Related U.S. Application Data

(60) Provisional application No. 60/940,925, filed on May 30, 2007.

(51) Int. Cl.
*G06Q 40/00*     (2012.01)
(52) U.S. Cl.
USPC .................. 705/14; 705/15; 705/45; 705/38; 705/66
(58) Field of Classification Search
USPC ................. 705/1–80; 345/107, 121; 349/86, 349/141, 147; 359/296
See application file for complete search history.

(56) References Cited

U.S. PATENT DOCUMENTS

| 5,635,693 | A | 6/1997 | Benson et al. |
|---|---|---|---|
| 5,929,770 | A | 7/1999 | Faita |
| 6,006,201 | A | 12/1999 | Berent et al. |
| 6,124,851 | A | 9/2000 | Jacobson |
| 6,864,875 | B2 | 3/2005 | Drzaic et al. |
| 6,894,615 | B2 | 5/2005 | Look |
| 7,106,296 | B1 * | 9/2006 | Jacobson ...................... 345/107 |
| 2002/0032637 | A1 | 3/2002 | Moshal et al. |
| 2002/0116328 | A1 * | 8/2002 | Bird et al. ......................... 705/38 |
| 2006/0212300 | A1 | 9/2006 | Resser et al. |
| 2007/0038510 | A1 | 2/2007 | Laghrari et al. |
| 2007/0114292 | A1 | 5/2007 | Breed et al. |
| 2008/0195489 | A1 | 8/2008 | Gold et al. |
| 2008/0231934 | A1 * | 9/2008 | Knafou et al. ................ 359/245 |
| 2009/0299857 | A1 * | 12/2009 | Brubaker ................... 705/14.66 |
| 2009/0313121 | A1 | 12/2009 | Post et al. |

OTHER PUBLICATIONS

"Express yourself with an on-board window sign", Final Edition, Kamloops Daily News, Kamloops, B.C.: dated Oct. 26, 2006, p. B.1.Fro.*
Science and Technical Information Center Dialogue. (120 pgs.), Oct. 2011.
iTAB V Brochure, "The Complete Automotive Information Collection and Distribution Tool", CDMData Inc., 2008.
Digitallot Brochure, Vehicle Information System, CDMData Inc., 2008.

* cited by examiner

*Primary Examiner* — Hai Tran
(74) *Attorney, Agent, or Firm* — Sutherland Asbill & Brennan LLP

(57) ABSTRACT

The invention of the wireless electronic vehicle window display system employs the latest technology in electronic paper and low power consumption wireless networking devices. One contemplated embodiment of the present invention consists of three main components: A vehicle information portal, an electronic vehicle window display system subscriber, and the electronic paper. The invention is intended to provide an effective method of displaying pricing, vehicle specifications, promotions, and warranties on vehicles at the dealer's lot. The invention removes the time-consuming and costly tasks of updating information on the current paper-based window sticker.

16 Claims, 10 Drawing Sheets

WIRELESS ELECTRONIC VEHICLE WINDOW DISPLAY SYSTEM

CROSS-REFERENCE TO RELATED APPLICATIONS

This application claims priority to U.S. Provisional Pat. No. 60/940,925 filed on May 30, 2007 which is hereby incorporated by reference in its entirety. Although incorporated by reference in its entirety, no arguments or disclaimers made in this provisional application apply to this non-provisional application. Any disclaimer that may have occurred in the disclosure of the above-referenced application is hereby expressly rescinded.

BACKGROUND OF THE INVENTION

1. Field of the Invention

The field of the invention is related to vehicle sale information displays or commonly known as Window-Stickers and buyer's guide.

2. Description of Related Art including Information Disclosed Under 37 CFR 1.97 and 1.98.

Generally known methods of displaying specific vehicle information to the consumer all involve paper based methods and products. Indeed, Paper-based Vehicle Documents have been the standard information display mechanism at the product for decades. Aside from the dealer's Web site, automobile publications, targeted general advertisements, or manufacturer and dealer television spots and brochures, the window sticker and hang tag are the only other means of presenting specific vehicle information to the buyer.

The ability to electronically change information has been around for many years. Examples of these can be found in U.S. patent application Ser. Nos. 6,894,615 and 5,929,770, both of which are incorporated herein by reference in their entirety. However, these prior art fail to address the need to provide a wireless electronic window sticker to replace paper based window sticker products.

All referenced patents, applications and literatures are incorporated herein by reference in their entirety. Furthermore, where a definition or use of a term in a reference, which is incorporated by reference herein is inconsistent or contrary to the definition of that term provided herein, the definition of that term provided herein applies and the definition of that term in the reference does not apply. The invention may seek to satisfy one or more of the above-mentioned desires. Although the present invention may obviate one or more of the above-mentioned desires, it should be understood that some aspects of the invention might not necessarily obviate them.

BRIEF SUMMARY OF THE INVENTION

Each vehicle presented for sale on an automobile dealer's lot must display specific information such as vehicle specifications, pricing, and promotions to the buying public by means of a vehicle window sticker and Buyer's Guide (warranty). Going forward, all references to Window Stickers and Buyer's Guides will be referred to as Vehicle Documents. The Vehicle Documents are daylight-readable and mounted within the vehicle behind the window glass. Currently, all automotive window stickers are paper-based, single application, and single use. Application and removal of the current window stickers are time-consuming, laborious, and prone to errors which require re-stickering, as in when a displayed vehicle price change is requested. In addition, where more and more importance is being placed on finding environmentally friendly business practices, the current paper based window stickers waste significant paper resources and associated printing ink.

The value of a vehicle changes over time. In order to be competitive in the market place, most dealers use formula-based automated pricing to lower the price of a vehicle based upon how long a vehicle has been on their lot. The basis for price comparisons, based upon vehicle valuation, comes from information providers such as NADA, Kelley Blue Book, and Black Book. From time to time, an automobile dealer will also want to inform potential buyers of special promotions by displaying this information on the window sticker.

These common changes to information displayed at the vehicle result in a time-consuming and costly effort to re-sticker all vehicles on the lot. Each vehicle must be physically revisited for any Vehicle Document change.

Therefore, it is necessary to provide a method and apparatus to allow common vehicle information to be displayed on a vehicle that is accurate, dynamic, changeable, customizable, and does not require unsightly, time-consuming and costly application and re-application of window stickers on all vehicles, both new and used. In addition, a wireless electronic window sticker as shown in the present invention will also allow possible customizable marketing abilities once very difficult and tedious with the prior paper based window stickers.

SUMMARY OF THE INVENTION

Figure 1:
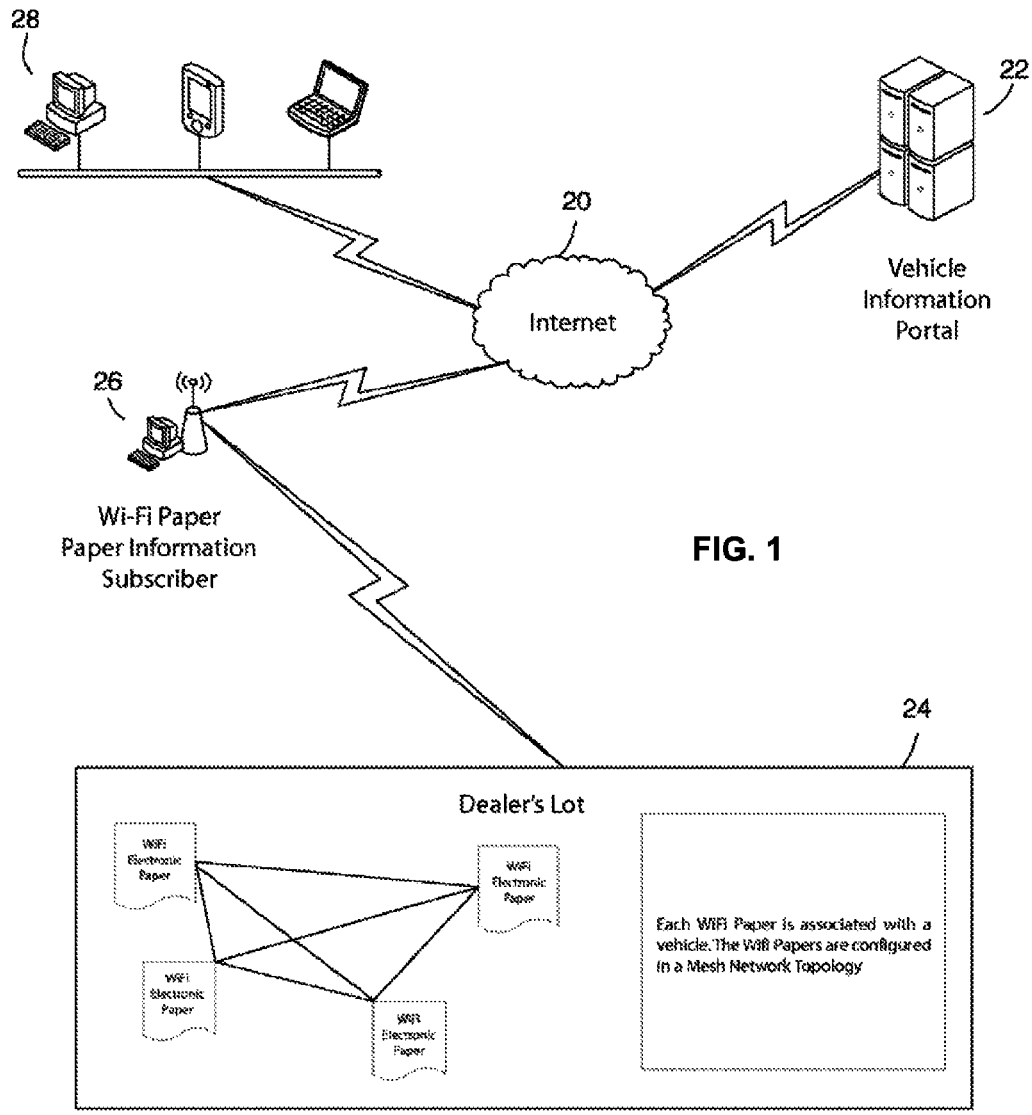
FIG. 1 is a schematic view of one contemplated embodiment of the present invention.

The inventors have discovered that an Electronic Vehicle Window Display System (herein the "invention") will provide an extended vehicle information portal at the automobile itself. In one embodiment, the invention is a self-powered, daylight-readable, networked automobile information display which is designed to replace all current, static, paper-based window stickers.

A contemplated embodiment includes an electronic paper unit consisting of a low power consumption active matrix display. The electronic paper is contemplated to be in an A4 sized electronic display paper (flexible display substrate) to mimic the appearance of a regular letter sized piece of paper. It is contemplated that the electronic paper may be powered by solar energy or rechargeable batteries or both concurrently. In one embodiment, the electronic paper screen is made with commonly used technology such as in any electro-optic display overlays as shown in U.S. Pat. Nos. 6,864,875, 6,124,851, 6,704,133, and 7,106,296.

The electronic paper in the contemplated embodiment also includes a wireless module that functions as a radio frequency (RF) transceiver, RF omni-directional antenna, high-density rechargeable batteries, embedded software applications, graphics controller, non-volatile memory, solar strip, capacitive strip, and rigid polymer frame. The electronic paper provides the advantage of being remotely upgradeable and customizable and interactive with the viewer by also incorporating a proximity sensor which detects when a viewer is near the electronic paper and can immediately begin displaying the user-defined vehicle information.

The contemplated embodiment also including a low-power base transmitter or an electronic paper information distributor unit which resides on a cable-based Ethernet or Cellular network and which would operate in conjunction with the electronic paper unit. Each contemplated electronic paper unit exists as part of a wireless mesh network, having a unique identifier on that network. The contemplated invention can receive, store, and forward data within its protected network, with all network traffic originating from a low-power base transmitter hosted at the dealer's on-lot offices. Line-of-Site (LoS) between the base transmitter and any electronic paper unit is not required, and due to the nature of the mesh network, inter-transceiver distances of up to 600' can be achieved with no loss of signal or data bandwidth. Packets of data from the base transmitter are transmitted to the mesh network, propagating throughout the network in search of its intended electronic paper unit ID. A preferred data path is established between the base transmitter and the electronic paper unit as the remaining data packets are transmitted to their specific destination unit.

In one embodiment, the base RF transmitter is a pass-through mechanism for data intended for the electronic paper units on the automobile lot. The base RF transmitter compresses and encrypts incoming data from the back-end network prior to transmission. The data which populates each Electronic paper unit exists as a record in the dealer's inventory database—including text, graphics, and display rules. The database is populated by data from any number of sources, including direct entry if desired.

The invention also includes a vehicle information portal which acts as the central repository of the dealer's inventory. The dealer uses a web based application to manage the inventory of the information. The vehicle information portal also provides an application programming interface allowing integration with any existing inventory management systems at the dealership. In one embodiment, the information stored on the vehicle information portal may be stored on one or more computer servers hosted remotely to ensure information protection and easy back-up and recovery. In addition, each dealership will have another computer on site which is embedded with the web based application which will allow the dealer to make on-site changes and modifications to the vehicle information to be displayed on the electronic paper.

An object of the present invention is to offer reusability. Once a vehicle is sold, the inventions' Electronic paper unit can be reused on a different vehicle. Any Vehicle Identification Number (VIN) may be associated with any Electronic paper ID.

Another object of the present invention is allow the invention to contain a unique ID which can correspond to a particular Vehicle Identification Number, in order to ensure that information broadcast over the mesh network intended for a particular vehicle corresponds correctly to the display on that vehicle.

Another object of the present invention is to offer ease of deployment and removal. The electronic paper part of the present invention does not use adhesive for attachment to the inside of the vehicle's window.

Another object of the present invention is to offer quick update of the vehicle information without physically re-visiting the vehicle. The updated information such as pricing, vehicle specifications, and promotions can be transmitted from any Internet-connected computers to the intended vehicle, updating the Electronic paper associated with that vehicle remotely. A decrease in manual labor in updating vehicle information can allow more productivity for the vehicle dealer or lot to focus on other areas of interest.

Another object of the present invention is to enable dynamic updating to the dealer to ensure his prices match his advertised prices elsewhere, such as his private website, third-party websites, his dealer management system, etc. This consistency in vehicle pricing and information can protect the dealer from such unwanted activity such as bait-and-switch or false advertising claims. In the contemplated invention, If desired, accurate pricing information will be available at the vehicle just as soon as it is available to the dealer Another object of the present invention is that by using the Electronic paper, there is no limitation on the number or frequency of information changes displayed at the vehicle. This also saves on consumables and decreases costs and expenses on paper and non-reusable items.

Another object of the present invention is to also allow information beyond just vehicle information such as marketing ads, commercials, and promotional deals, to be shown on the electronic paper whereby adding value to the dealer's opportunity to market other promotions or incentives while still providing the vehicle information to the buyer. It is contemplated that for a successful dealer who has high traffic volume, it could also generate income by allowing outside companies to advertise on the dealer's lot.

Another object of the invention is to allow increased interactivity in the vehicle buying process. For example, one present embodiment of the invention would allow users to access the internet from the electronic vehicle paper itself and perhaps research car insurance information or reviews and ratings of the particular vehicle before purchasing. In addition, another embodiment of the invention would allow users to input their personal information on the electronic vehicle paper and receive instant credit information or allow them to purchase or order vehicle accessories.

DETAILED DESCRIPTION OF THE DRAWINGS

As shown in FIG. 1, in one contemplated embodiment, the present invention consists of three main components: A vehicle information portal (22), an electronic paper information subscriber (26), and the electronic paper (24). A vehicle information portal (22) is a central repository of the dealer's inventory. A dealer uses a web-based application to manage the inventory information. The vehicle information portal (22) also provides an application programming interface allowing integration with any existing inventory management systems at the dealership.

The main function of an electronic paper information subscriber (26) is to receive updated information for vehicles such as pricing, specifications, and promotions. The subscriber relays this information to electronic papers residing on those vehicles. In the contemplated present invention, an electronic paper unit (24) serves as an electronic paper window sticker. It displays the information wirelessly received from the vehicle information portal (22). In one embodiment, the information from the vehicle information portal (22) that is sent to the electronic paper information subscriber (26) can be also wirelessly sent to the dealer's employees handheld devices (28) such as mobile phones, PDA's and/or laptops.

Figure 2:
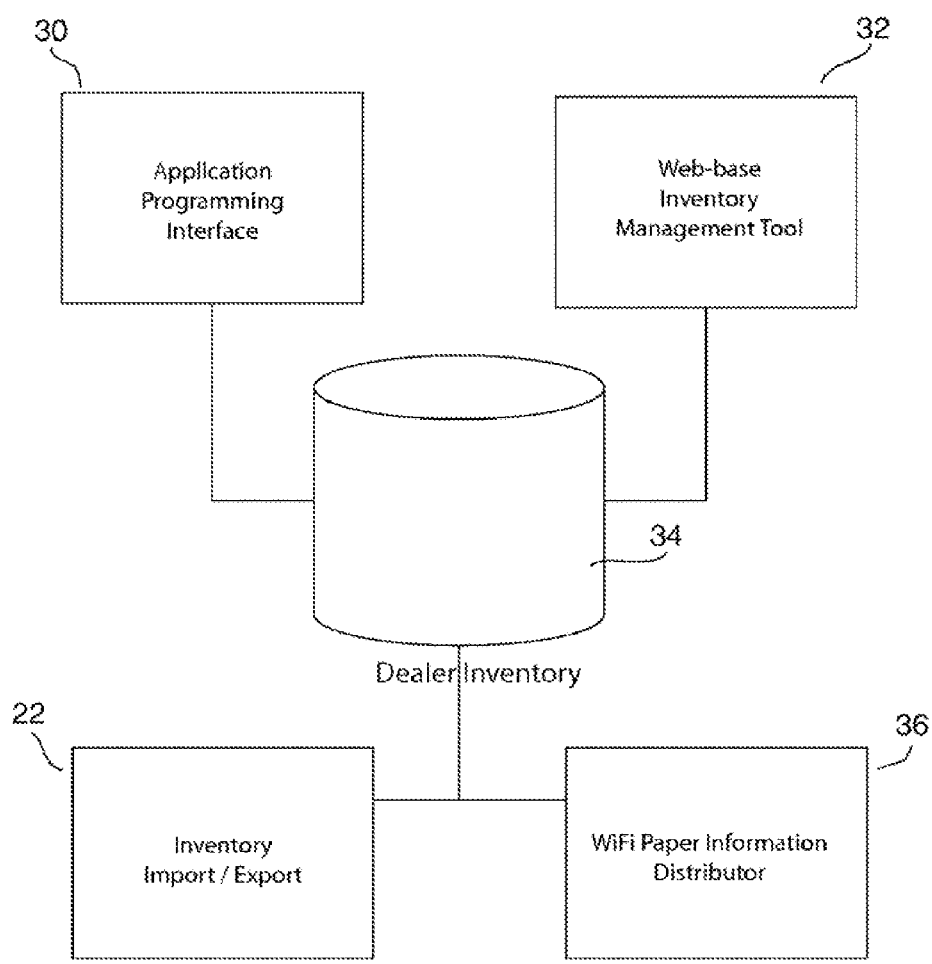
FIG. 2 is a schematic view of one contemplated embodiment of the vehicle information portal of the contemplated embodiment of the present invention.

As seen in FIG. 2, the internal connections and workings of the vehicle information portal (22) are shown. In particular, the dealer inventory (34) is stored with the complete information dealing with a dealer's inventory, pricing, vehicle information and any other related information. The vehicle information portal (22) will also have an application programming interface that is customizable to the user which will allow on-site and/or off-site control of the information contained in the vehicle information portal (22). In addition, there exists a web-based inventory management tool (32) that allows modification and changes to be made to the information stored on the vehicle information portal (22) remotely over the internet The vehicle information portal (22) also contains information on the inventory and import/export of vehicles and arrival dates. Information stored on the vehicle information portal (22) is wirelessly transmitted to the electronic paper or Wi-Fi paper information distributor (26).

Figure 3:
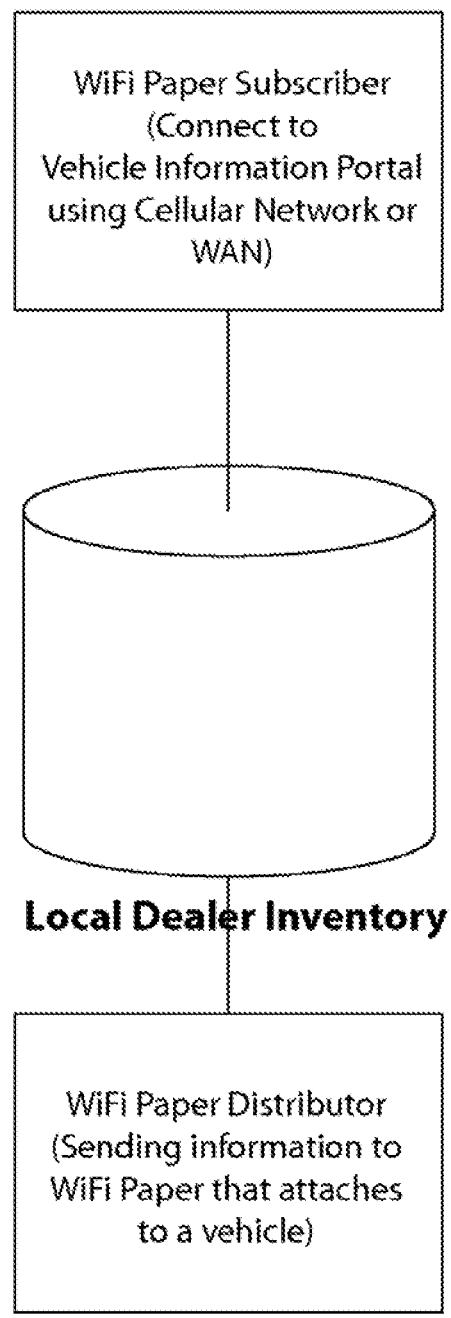
FIG. 3 is a schematic view of one contemplated embodiment of the Electronic paper Information subscriber of the contemplated embodiment of the present invention.

Turning to FIG. 3, the internal connections and workings of the electronic paper information subscriber, also termed Wi-Fi paper information subscriber, is shown. In particular, the electronic paper information subscriber (26) connects to the vehicle information portal (22) via a cellular network or WAN. The electronic paper subscriber (26) then wirelessly relays the dealer inventory information to the individual electronic paper units (24).

Figure 4:
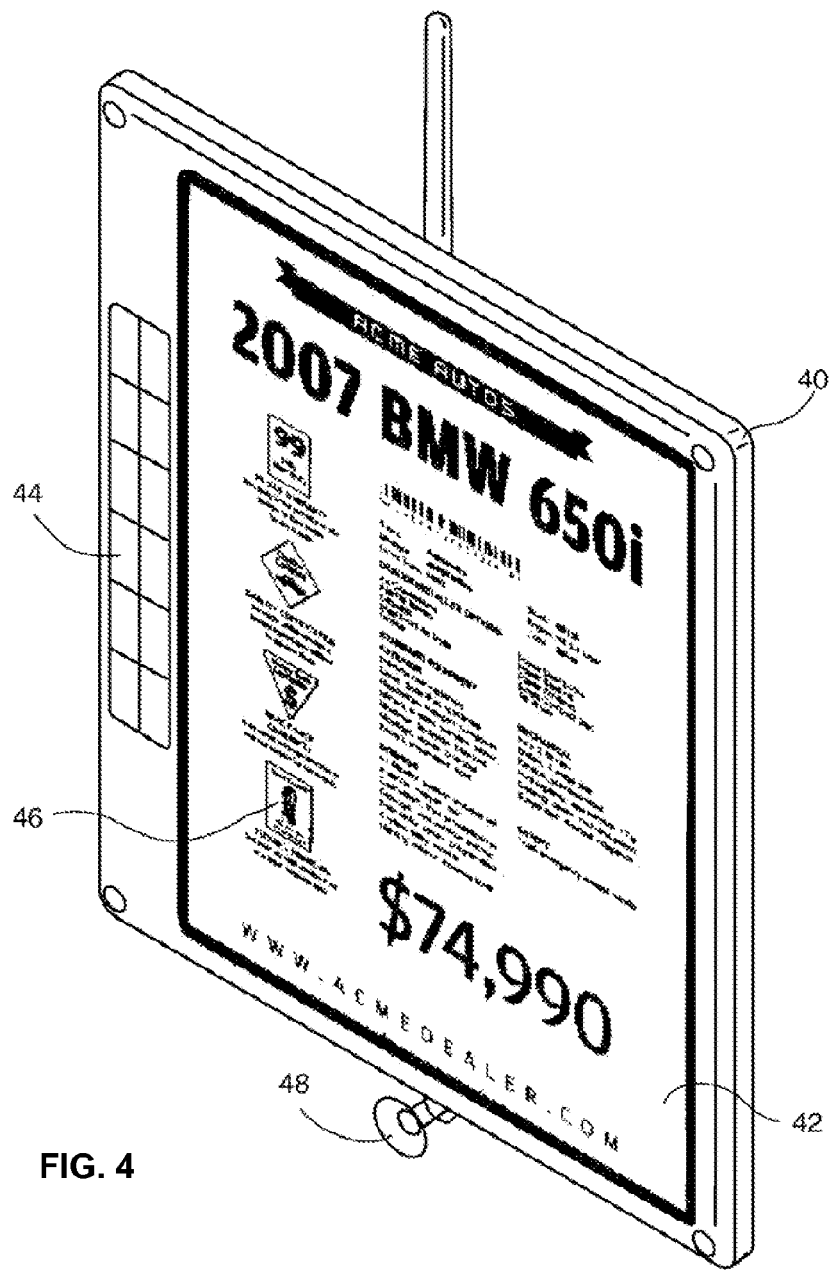
FIG. 4 is a view of the front side of the one embodiment of the electronic paper unit portion of the present invention.

FIG. 4 depicts one possible embodiment of an individual electronic paper (26). In particular, the electronic paper (26) is housed within a rigid frame (40) having an outer clear covering (42) for protection. Outer clear covering (42) may also be made with an anti-glare material to improve readability of the contents on the screen. In the present embodiment, the information is shown on an electro-optic display (46) similarly used for electronic book viewer screens. In addition, in this present embodiment, the electronic paper is powered by solar panels (44) but can also in other embodiments be powered by rechargeable batteries. An attachment device, in this embodiment in the form of a suction (48), is present to ensure proper attachment of the electronic paper to the vehicle window.

Figure 5:
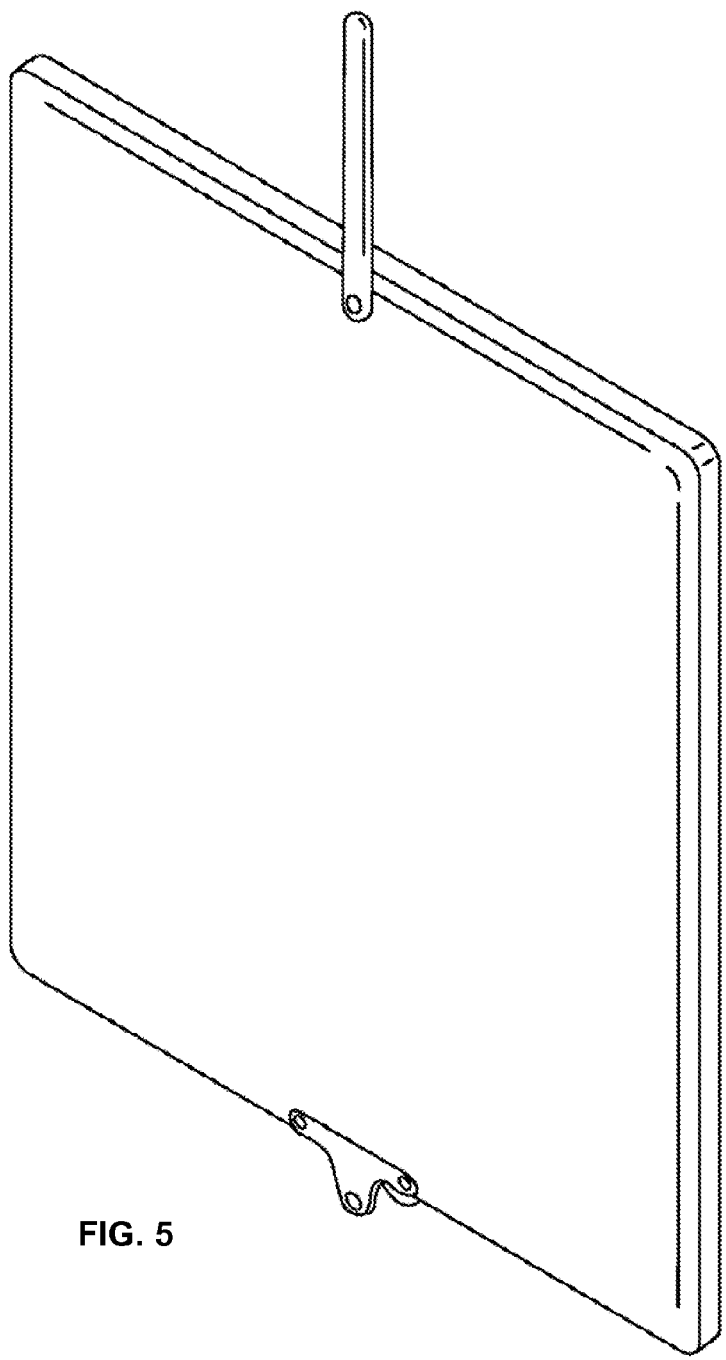
FIG. 5 is a view of the back side of the one embodiment of the electronic paper unit portion of the present invention.

FIG. 5 depicts to the back of the same electronic paper as shown in FIG. 4.

Figure 6:
FIG. 6 is a view of the front side of another possible embodiment of the electronic paper unit portion of the present invention.

FIG. 6 depicts another possible embodiment of the electronic paper with different possible attachment devices.

Figure 7:
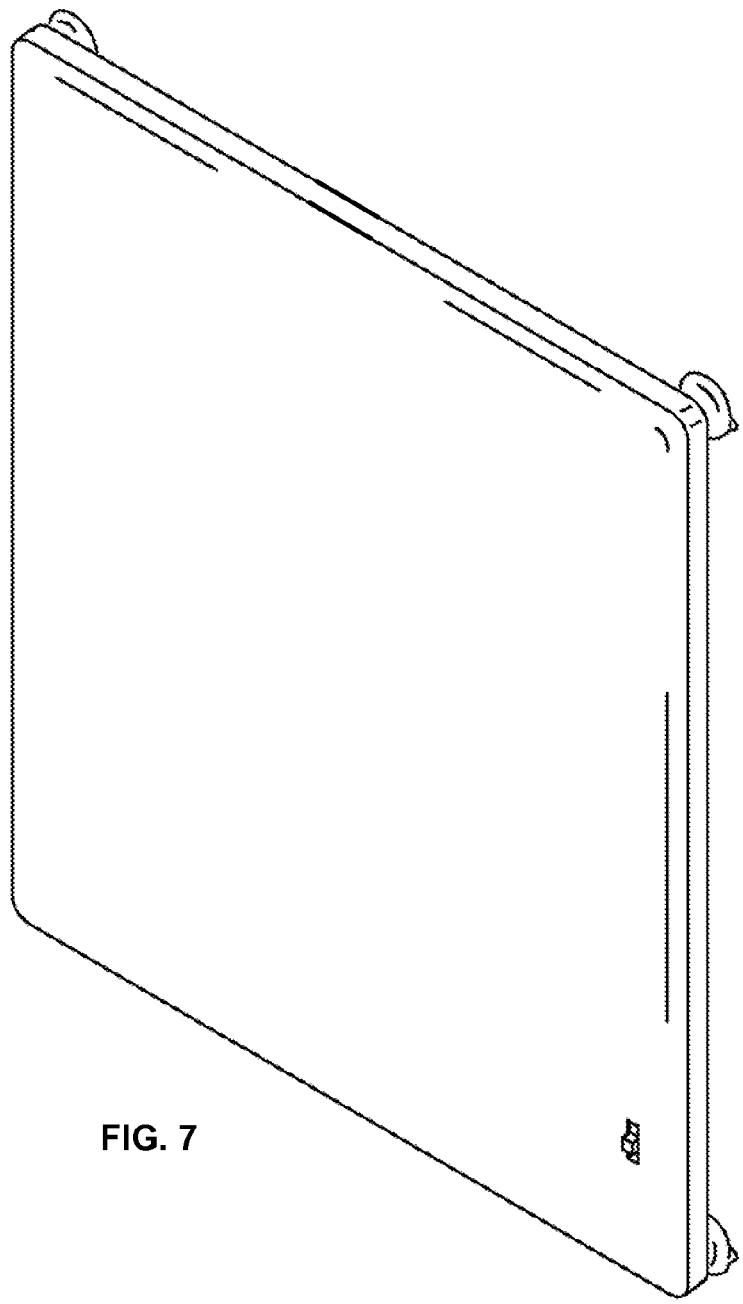
FIG. 7 is a back view of the embodiment of the electronic paper unit portion of the present invention shown in FIG. 6.

FIG. 7 depicts the back of the electronic paper embodiment shown in FIG. 6.

Figure 8:
FIG. 8 is a front view of the front side of another embodiment of the electronic paper unit portion of the present invention featuring a photo-frame appearance.

FIG. 8 depicts another embodiment of the electronic paper in the form of a picture frame.

Figure 9:
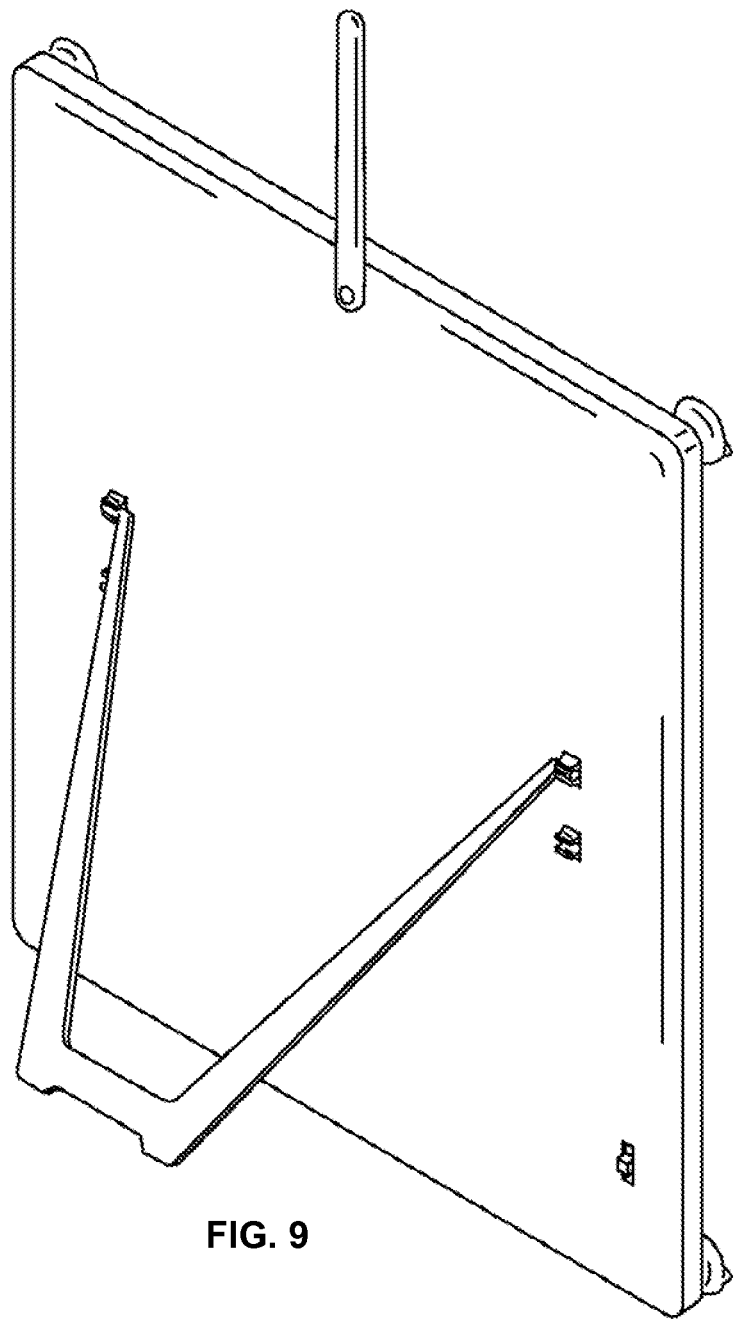
FIG. 9 is a view of the back side of the embodiment of the electronic paper unit portion of the present invention shown in FIG. 8 and depicts one embodiment of a backing support member.
Figure 10:
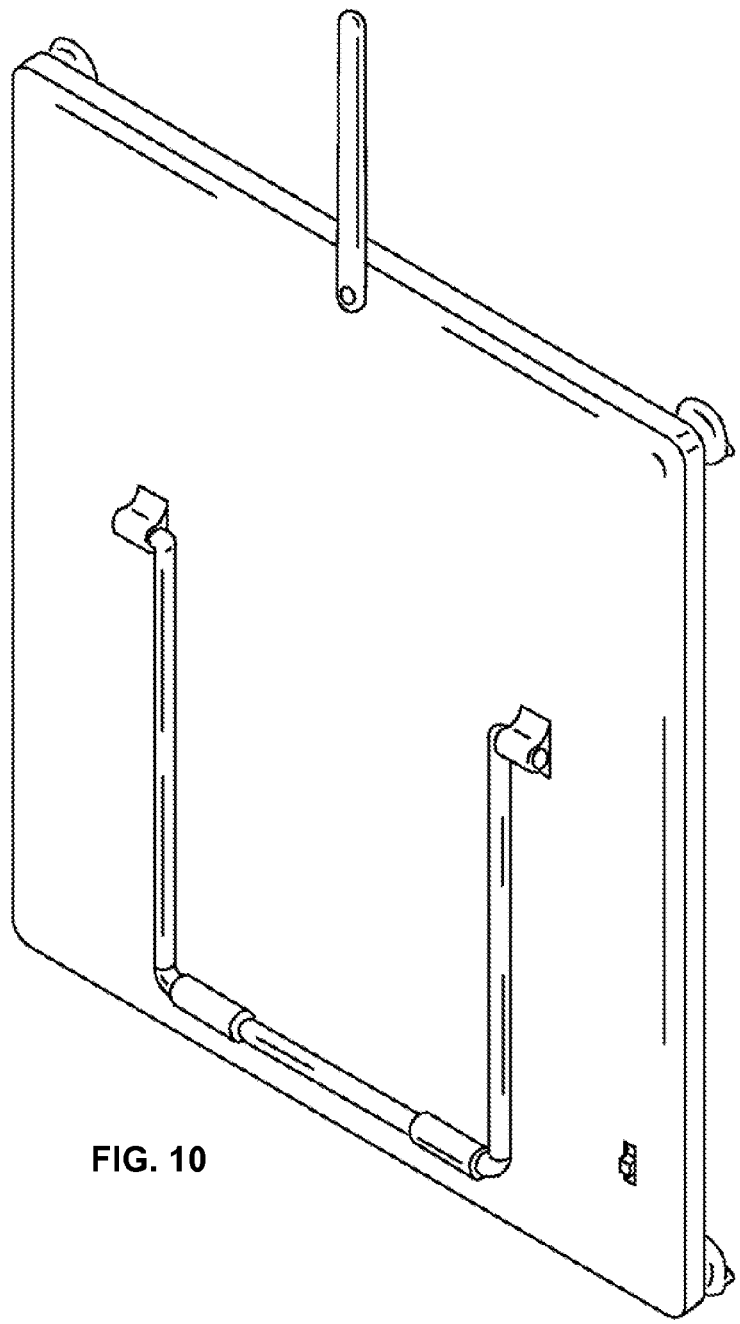
FIG. 10 is a view of the back side of the embodiment of the electronic paper unit portion of the present invention shown in FIG. 9 and depicts another possible embodiment of a backing support member.

FIG. 9 and FIG. 10 depicts alternative supports for the back of the electronic paper embodiment as shown in FIG. 8.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed herein even when not initially claimed in such combinations.

What is claimed is:

1. An electronic vehicle window display system for marketing vehicles to a user, the system comprising:
   a vehicle information portal including a server and a database of an inventory;
   an information subscriber having a signal sending unit, and the information subscriber is connected to the vehicle information portal via the network;
   an electronic vehicle window display coupled to a vehicle on the automobile dealership and configured to display vehicle information regarding the vehicle, wherein the electronic vehicle window display includes a wireless signal receiving unit that receives a wireless signal regarding the vehicle from the information subscriber;
   at least one electronic device connected to the vehicle information portal and the information subscriber via the network;
   wherein the electronic vehicle window display receives personal information from the user, wherein the at least one electronic device dynamically modifies the vehicle information displayed on the electronic vehicle window display based at least in part on the personal information received from the user; and
   wherein the wireless signal is received by the electronic vehicle window display via at least one of Wi-Fi, WiMax, or radio frequency.

2. The vehicle window display system of claim 1, wherein the electronic vehicle window display is an electronic paper.

3. The vehicle window display system of claim 2, wherein the network is at least one of Internet, cellular network, or satellite network.

4. The system of claim 2, wherein the electronic paper is self powered.

5. The system of claim 2, wherein the electronic paper has a flexible display substrate.

6. The vehicle window display system of claim 1, wherein the at least one electronic device has a software application capable of changing and modifying the vehicle information displayed on the electronic vehicle window display.

7. The system of claim 1, wherein the electronic vehicle window display contains a unique identifier (ID) associated with a vehicle identification number (VIN) of the vehicle, and wherein the wireless signal received by the electronic vehicle window display is routed to the electronic vehicle window display based at least in part on the unique ID associated with the VIN of the vehicle.

8. A method of displaying vehicle information for vehicles at a dealership to a user, the method comprising:
   receiving, at a client system with user interface and signal-sending unit, vehicle information from a vehicle information portal;
   processing the received vehicle information to determine information to display on at least one of a plurality of electronic vehicle window displays, each electronic vehicle window display having a signal-receiving unit for receiving signals sent from the client system wirelessly;

wherein each electronic vehicle window display has an identifier so that signals are selectively sent to each electronic vehicle window display;

under control of the client system, sending a signal to at least one of the plurality of electronic vehicle window displays, wherein the signal displays an image on the electronic vehicle window display;

receiving personal information from a user of the at least one electronic vehicle window display;

sending, by the client system, the personal information from the electronic vehicle window display to the vehicle information portal;

and sending an updated signal to the at least one electronic vehicle window display, wherein the updated signal changes the image being displayed on the at least one electronic vehicle window display based at least in part on the received personal information of the user.

9. The method of claim 8, wherein the client sends the signal wirelessly to the electronic vehicle window display via at least one of Wi-Fi, WiMax, or radio frequency.

10. The method of claim 9, wherein the electronic vehicle window display has a rechargeable battery, embedded software application.

11. The method of claim 9, wherein the signal-sending unit is a low-power base transmitter hosted at the dealership.

12. The method of claim 11, further comprising the steps of displaying multiple pages of information on the electronic vehicle window display, and wherein the low-power transmitter compresses and encrypts data before sending to the electronic vehicle window display.

13. The method of claim 12, wherein the electronic vehicle window display has an attachment element to attach to an inside of a vehicle's window.

14. The method of claim 13, wherein the signal is sent via Wi-Fi.

15. The method of claim 14, wherein the information shown on the electronic vehicle window display is specifically related to the vehicle to which the electronic vehicle window display is attached.

16. The method of claim 15, wherein the information shown on the electronic vehicle window display includes at least one of pricing information, vehicle specifications, or promotional information.

* * * * *

UNITED STATES PATENT AND TRADEMARK OFFICE
CERTIFICATE OF CORRECTION

PATENT NO. : 8,510,155 B2
APPLICATION NO. : 12/130761
DATED : August 13, 2013
INVENTOR(S) : Tony Hoang, Scott Lucas and William Post It is certified that error appears in the above-identified patent and that said Letters Patent is hereby corrected as shown below:

On the title page, Item (75) Inventors, please add --William Post, Mesa, AZ--.

Signed and Sealed this
Eighth Day of October, 2013

Teresa Stanek Rea
*Deputy Director of the United States Patent and Trademark Office*